Figure 3:
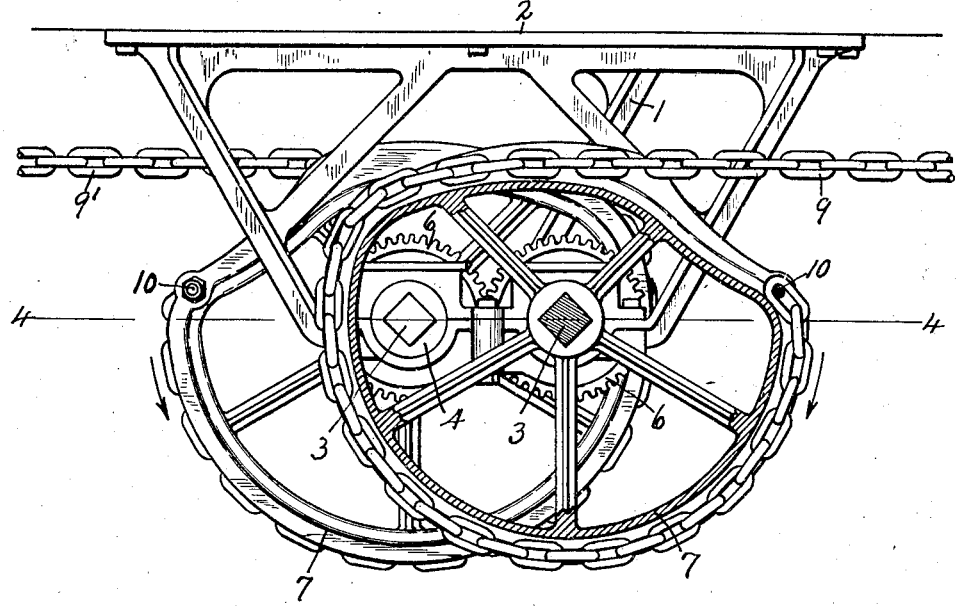

Jan. 11, 1927.  
W. D. BREWSTER  
CAR BRAKE OPERATING MECHANISM  
Filed May 7, 1925    2 Sheets-Sheet 1
1,614,419
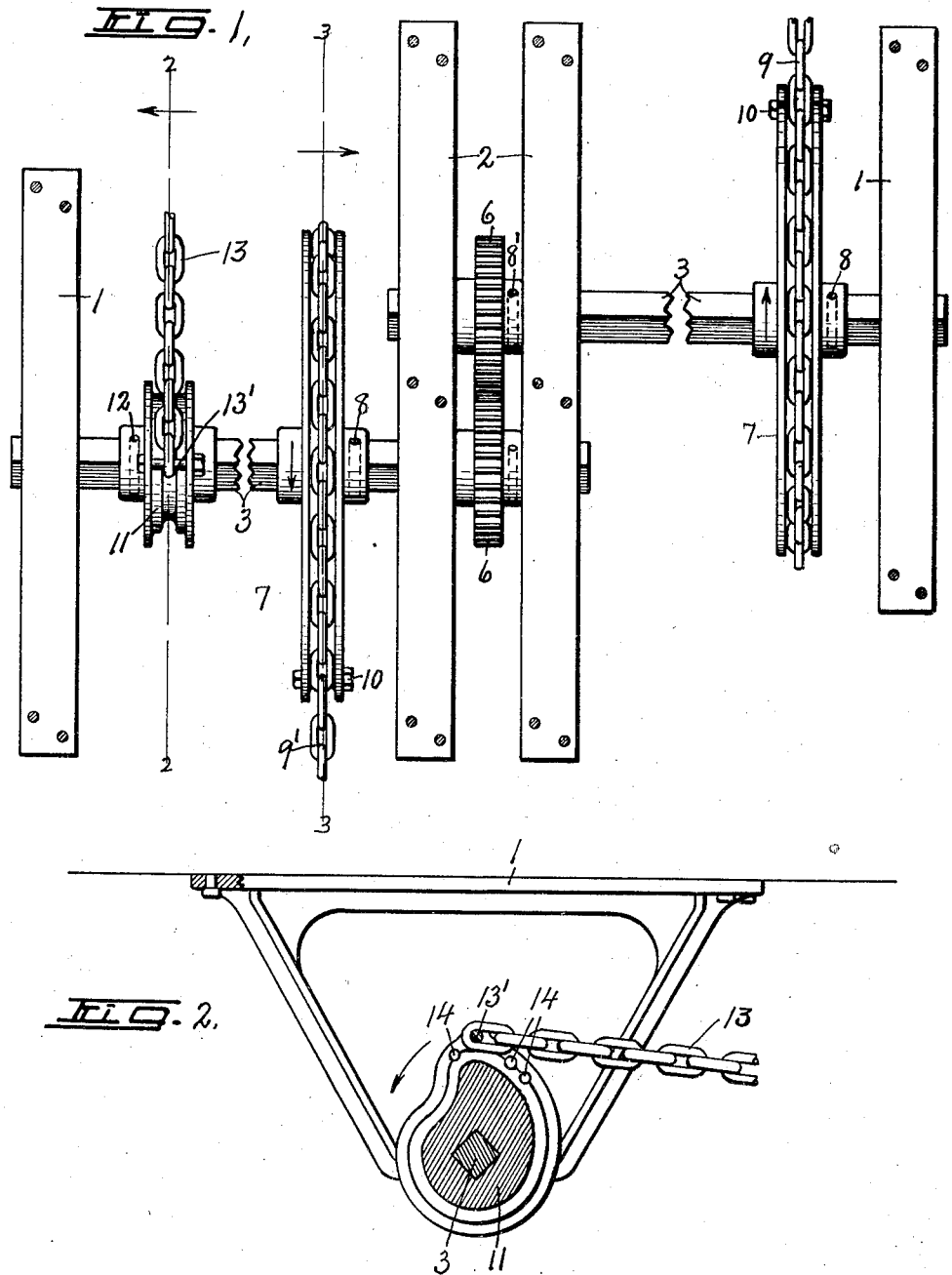

Jan. 11, 1927.

W. D. BREWSTER 1,614,419

CAR BRAKE OPERATING MECHANISM

Filed May 7, 1925  2 Sheets-Sheet 2

INVENTOR
W. D. Brewster
BY Denison & Thompson
ATTORNEYS

WITNESS
H. V. Hurst

Patented Jan. 11, 1927.

1,614,419

UNITED STATES PATENT OFFICE.

WILLIAM D. BREWSTER, OF SYRACUSE, NEW YORK, ASSIGNOR TO NATIONAL BRAKE COMPANY, INC., OF BUFFALO, NEW YORK, A CORPORATION OF NEW YORK.

CAR-BRAKE-OPERATING MECHANISM.

Application filed May 7, 1925. Serial No. 28,577.

This invention relates to car brake operating mechanism adapted to be used more particularly as an intermediary power transmitting means between a hand-operated staff or shaft and an air brake cylinder with which the cars are usually equipped but may be operated directly by hand or other power for transmitting motion directly to the brake or brakes.

In devices of this character the power is usually applied to the brake through the medium of chain cables and the main object of the present invention is to obtain a maximum force of application of the brakes with the expenditure of a minimum of power and also with a minimum travel of the chain or chains.

Another object is to construct the chain tensioning means in such manner as to automatically take up excess slack therein when released and by the same means to accelerate the initial tightening of the cables and to gradually increase the force of application of the brakes as they are brought closer to their braking positions.

A further object is to enable the various chain operating members to be adjusted axially relatively to each other for alignment with the operating parts or the parts operated upon so that in either case the draft will be in a direct line between the cable supporting drums and the particular operating and operated parts.

In other words, I have sought to provide an intermediate power transmitting mechanism which is more flexible in its adaptation to the operating or operated parts of different cars or different brake operating members.

Other objects and uses relating to specific parts of the device will be brought out in the following description.

In the drawings:

Figure 1 is a top plan of an intermediate brake operating means embodying the various features of my invention.

Figures 2 and 3 are transverse sectional views taken respectively on lines 2—2, and 3—3, Figure 1.

Figure 4:
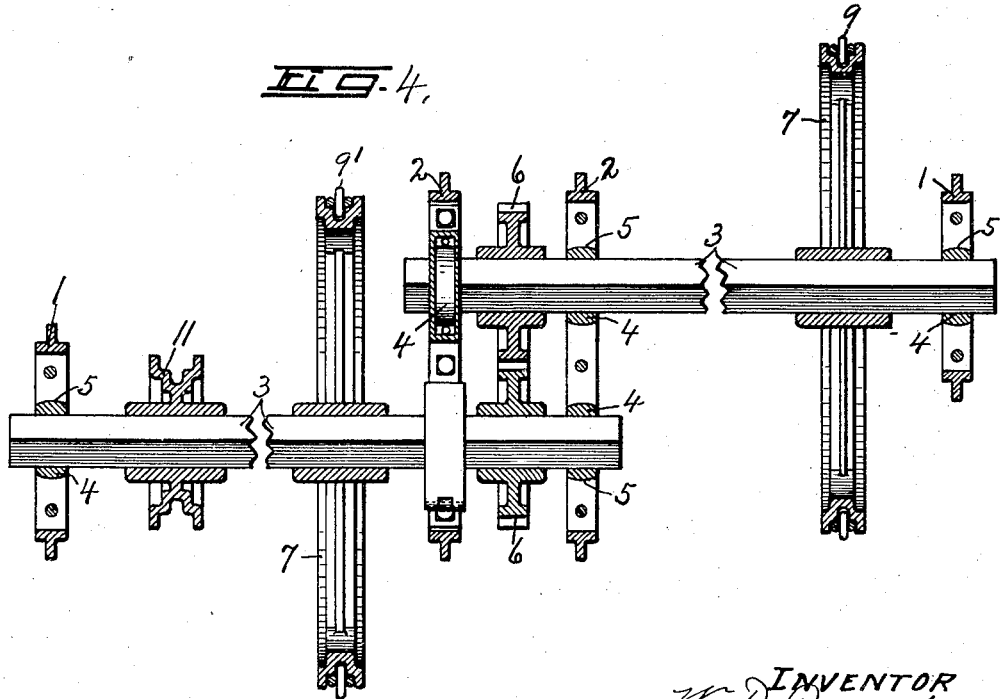

Figure 4 is a horizontal sectional view taken in the plane of line 4—4, Figure 3.

As illustrated, this device is adapted to be mounted upon the underside of a car for transmitting motion from one or more brake staffs or equivalent power applying devices or either or both ends of the car to an air brake cylinder or other brake applying device on the car and comprises opposite end and intermediate brackets —1— and —2— adapted to be bolted or otherwise secured to the underside of the car frame or truck for receiving and supporting a pair of parallel shafts —3—.

These shafts are of square or angular cross section from end to end and are passed thru similar angular openings in bearing collars —4— which are provided with spherical peripheries having their centers in the axis of their respective shafts and journaled in corresponding spherical seats —5— (Fig. 4) in their respective brackets —1— and —2— to a free turning movement of said shafts and collars in the brackets in case the axis of the spherical openings —5— should not be co-axial with the axes of the corresponding shafts.

These shafts —3— are arranged in horizontally offset parallel relation and are connected by gears —6— of equal diameters for transmitting reverse motion from one to the other, each shaft being provided with a relatively large cable receiving and supporting drum —7— eccentrically splined thereon to rotate therewith and may be held in operative position against axial movement by suitable locking pins —8—.

The gears —6— are also splined upon their respective shafts —3— between the intermediate brackets —2— and are held in operative position against axial displacement by locking pins —8'—. Slightly more than one-half of each drum —7— is concentric with the axis of its corresponding shaft —3— and of relatively long radius while the remaining portions of the periphery of the drums are more or less eccentric to the axis of their corresponding shafts and gradually diminish in radius from the ends toward the center so that the weight of the concentric side is considerably in excess of that of the eccentric side and when free causes them to assume a balanced position mainly below the horizontal plane of the axes of the shafts —3— for automatically taking up excess slack in the chains which are attached thereto in a manner hereinafter described.

The peripheries of these drums —7— are grooved for receiving suitable chains —9— and —9'— which are passed in reverse directions around the concentric peripheries of their respective drums and are attached thereto by clamping bolts —10— as shown more clearly in Figure 3.

That is, one of the chains as —9— is attached at one end to the periphery of the drum at one end of the concentric portion of said periphery and is then passed around said concentric portion and returned across the upper side of the eccentric portion when the drum is in its normal position, the other end of said chain being adapted to be connected to a brake staff or other power device on one end of a car.

One end of the other cable —9'— is attached by its bolt —10— to the periphery of the corresponding drum —7— near the end of its concentric portion and is then passed around said concentric portion and returned along the adjacent eccentric portion to be attached to a brake staff or to the power device on the other end of the same car.

The drums are preferably adjusted along their respective shafts to bring their corresponding chains in direct line with the power device to which they are adapted to be connected and inasmuch as these power devices are usually arranged at opposite ends of the cars the shafts —3— extend transversely thereof but in spaced parallel relation each nearest to the power device for operating its corresponding drum.

When the drums are in their normal position with their larger portions at the undersides of their respective shafts their chains are attached to the ends of the concentric portions nearest the power device and by extending the chains around the concentric portions and across the overlying eccentric portions toward the corresponding power device it is evident that each chain will be normally wound upon approximately three-fourths of the periphery thereof when the brakes are released, but when winding the chain upon the power device the power will be immediately transmitted thru the chains to points in the longer radius of the concentric portion of the drum which radius is considerably longer than that of its corresponding gear or pinion —6— thereby greatly increasing the power transmitted to said pinion over that applied to the unwinding of the chain by the primary power device.

A relatively small cable receiving drum —11— is splined upon one of the shafts —3— and held against axial movement by a locking key or pin —12—, said drum being also provided with a peripheral groove —11'— for receiving a chain cable —13—.

Substantially one-half of the drum —11— is concentric with the axis of the shaft —3— while the remaining portions are more or less eccentric and of greater radius then the concentric portion.

One end of the chain cable —13— is attached to the highest point of the grooved perimeter of the drum —11—, the other end being adapted to be connected to the brake operating rod or stem of an air brake cylinder or may be connected to any other suitable brake operating device, it being understood that the drum —11— is adjusted to bring its cable —13— in direct alignment with the brake operating part actuated thereby so as to exert a direct pull thereon when the cable is tightened.

It will be observed that the cables —9— and —9'— lead from the upper portions of the peripheries of their respective drums in reverse directions to their respective operating members, not shown, and that the cable —13— leads from the upper portion of the periphery of its drum —11— in a direction opposite that of the adjacent larger drum —7— on the same shaft and when the larger drums —7— are in their normal starting positions as shown in Fig. 3 the high point of the drum —11— to which the cable —13— is attached is directly over the axis of the corresponding shaft —3—, the brakes being then in their released positions.

Under these conditions the winding of either of the cables —9— or —9'— upon the power device at the corresponding end of the car will cause the rotation of the brake applying drum —11— in the direction indicated by the arrow, Figure 2, thereby causing an initial rapid take-up of the slack of the brake-operating chain —13— by reason of its connection with the high point of the drum and as the rotation of the drum —11— continues the chains —13— will gradually be brought closer to the axis of the shaft —13— for greatly increasing the force of application of the brakes by the application of a given power to the operation of either of the chains —9—.

If the brake is to be operated from one end only of the car it is evident that the smaller drum —11— may be used in connection with a single one of the larger drums —7— resulting in substantially the same force of application of the brakes by a predetermined power applied to the operation of the chain for the larger drum and therefor I do not wish to limit the invention to the use of two of the large drums nor to the gears for transmitting motion from one shaft to the other.

*Operation.*

Assuming that the brakes are released and that the drums —7— and —13— are in their starting positions shown in the drawings preparatory to applying the brakes, and then assuming that the chain —9— is attached to a power device on the corresponding end of the car and wound thereon, the corresponding drum —11— will be rotated in the direction indicated by the arrow, Figure 3, for unwinding the chain therefrom causing the other shaft —3— and parts carried thereby to be rotated in a reverse direction resulting in the slackening of the chain —9'— and tightening of the brake-operating chain —13— which then rides from the higher point to the lower point of the drum —11— for increasing the force of application of the brakes as the winding of the cable —9— upon its operating device continues.

As soon as the tension upon the cable —9— is released by unwinding it from its power device the drums —7— will automatically return to their starting positions by reason of their eccentric weight to take up the slack of the chains —9— and also to return the drum —11— and its cable —13— to their brake releasing positions.

On the other hand if it is desired to operate the brake from the other end of the car the chain —9'— will be wound upon its corresponding operating device thereby rotating its drum —7— in the direction indicated by the arrow, Figure 3, and causing the drum —11— to rotate in the direction indicated by the arrow, Figure 2, for tightening the cable —13— and thereby operating the brake mechanism connected thereto, it being understood that during this last operation the cable —9— will be slackened and that when the tension upon the cable —9'— is released the drums —7— and —11— will be automatically restored to their starting positions in the manner previously explained.

The size of the drums —7— and —11— and adjustments of the cables —9—, —9'— and —13— are proportioned to allow for a maximum movement of the brakes from their extreme braking positions to their extreme releasing positions with ample allowance for stretching of the chains or wear incidental to the use of the brakes, leaving sufficient margin of overlap of the cables on their respective drums to adjust the tightening of the brakes under all conditions of wear or stretching of the chains.

For this latter purpose the drum —11— may be provided with two or more bolt holes —14— for receiving the chain attaching bolts as —13'—, Figures 1 and 2.

What I claim is;

In a car brake operating mechanism parallel horizontal rock shafts, means for transmitting motion from one shaft to the other, relatively large drums eccentrically mounted upon said shafts, a relatively smaller drum eccentrically mounted upon one of the shafts, separate cables attached to the peripheries of the larger drums respectively and extending in opposite directions therefrom and adapted to be connected to separate power devices, and a separate cable attached to the periphery of the smaller drum and adapted to be connected to a brake applying device.

In witness whereof I have hereunto set my hand this 4th day of May, 1925.

WILLIAM D. BREWSTER.